United States Patent
Hubbard et al.

(10) Patent No.: US 7,870,101 B2
(45) Date of Patent: Jan. 11, 2011

(54) METHOD AND APPARATUS FOR PRESENTATION OF A SECURITY-FOCUSED REPOSITORY WITH A PARTY-FOCUSED REPOSITORY

(75) Inventors: Mark William Hubbard, Maple (CA); David Gerard Kuehr-McLaren, Apex, NC (US); Govindaraj Sampathkumar, Cary, NC (US); Janette Siu Jong Wong, North York (CA)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/323,749

(22) Filed: Dec. 30, 2005

(65) Prior Publication Data

US 2007/0156765 A1 Jul. 5, 2007

(51) Int. Cl.
 *G06F 7/00* (2006.01)

(52) U.S. Cl. .................................................... 707/661
(58) Field of Classification Search ................ 707/200, 707/661
 See application file for complete search history.

(56) References Cited

U.S. PATENT DOCUMENTS

2004/0230618 A1* 11/2004 Wookey .................... 707/200
2004/0260714 A1* 12/2004 Chatterjee et al. .......... 707/101

* cited by examiner

*Primary Examiner*—Apu M Mofiz
*Assistant Examiner*—Ajith Jacob
(74) *Attorney, Agent, or Firm*—Jeanine S. Ray-Yarletts; Law Office of Jim Boice

(57) ABSTRACT

An abstraction layer associates a party-focused object, a security-focused object, or both, with an abstraction object. The party-focused or security focused object has one or more properties. The properties are presented in the abstraction object defined by the mapping schema. The abstraction layer converts a set of repository objects to at least one abstraction object.

21 Claims, 6 Drawing Sheets

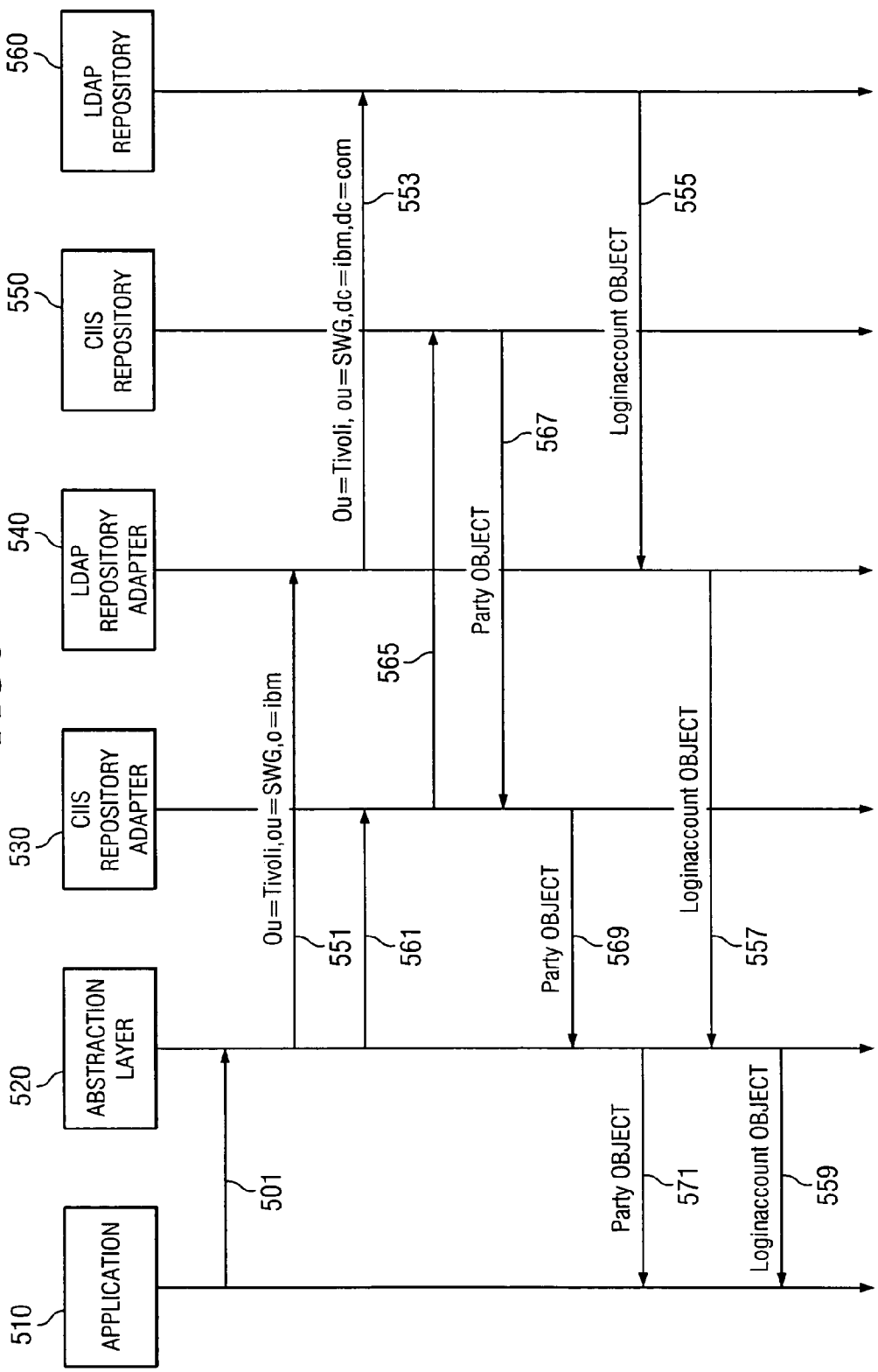

METHOD AND APPARATUS FOR PRESENTATION OF A SECURITY-FOCUSED REPOSITORY WITH A PARTY-FOCUSED REPOSITORY

BACKGROUND OF THE INVENTION

1. Field of the Invention

The present invention relates generally to an improved data processing system and in particular to a method and apparatus for integrating repository data. Still more particularly, the present invention relates to a computer implemented method, data processing system, and computer program product to permit an application to use secondary repositories to supplement data from a security-focused repository or a party-focused repository as may be done by combining properties of a security-focused object with a party-focused object.

2. Description of the Related Art

Most software applications require some mechanism to administer access control with respect to the information used by people and programs. For example, a manager for a department may be associated with data and applications that permit him to see his own employees' salaries and not the salaries of others. Organizations that use these applications employ a variety of schemas or models for representing and storing information about an entity to manage access to their data. An entity comprises persons, sub-organizations, groups, and roles. A particular representation of information about these entities is an organization model.

Depending on the nature of the applications requiring the access control, and the types of applications accessing the entities, the representation of the information about the entities can be very different between organization models. For example, an application for managing security of corporate information usually requires the objects holding entity information to be security-focused, while another application supporting business services requires the objects to be party-focused. In the case of a security application, the properties associated with the object refer to personal information such as name, title, address, login identification, and authorization and denial codes that are specific to a person. Although a record or object for an entity includes aspects concerning names and titles, some objects may be created for the exclusive use of a program for automatic execution. To the extent that properties of name and title are used, such properties provide a reference as to whom to contact in case the program encounters an anomalous condition. Consequently, a security-focused application has both objects that are associated with a person and objects that are associated with a program.

On the other hand, a business application or party-focused application requires a different set of properties for the entity or object. For an application that is party-focused, it is the role, rather than the person, that forms the basis of how the application operates. Thus, for example, a person operating under the role of a manager accesses the application. The application identifies the current role, for example, manager, thus providing access according to the authorized role only, and denying access to unauthorized persons. On the other hand, the same person may later access the application as an architect. The application then limits the person access based on his role as architect. Party-focused applications like to see a party "wearing the hat" of the role that the party plays. For example, when a party-focused application accesses Janette the Architect, the application wants to see Janette and characteristics about Janette as an Architect, and such characteristics may or may not be security-related at all.

Developers have developed models for representing various types of entities to meet increasingly specific requirements of an organization's software applications. Some of these representation models have found large enough acceptance to become standardized. Examples of standardized representation models for security-focused models are Lightweight Directory Access Protocol (LDAP), X.500 Directory, and Distributed Management Task Force's (DMTF) Common Information Management (CIM) specification. Examples of representation models of party-focused models include object management group's Party Management Facility and the Customer Profile Exchange found at http://www.cpexchange.org. Client Information Integration Solution (CIIS), a product of International Business Machines Corporation of Armonk, N.Y., is one such example. Party-focused properties that do not fit into the security-focused model are frequently stored in repositories separate from the security-focused repository.

An organization model becomes unmanageable and fragmented as applications are added to an organization's infrastructure. Security-focused models may represent data in one repository and party-focused models may represent data in a separate repository. Further, different applications using essentially the same type of entity models may have nuances that may result in further addition of custom repositories, essentially duplicating or fragmenting the entity data. There are serious overlaps among the security-focused representation models, party-focused representation models, custom representation models, and the vendor specific models. Nonetheless, integration of such party-focused repositories with security-focused repositories have only been achieved in the context of virtual directories and federated databases.

BRIEF SUMMARY OF THE INVENTION

The present invention provides a computer implemented method, computer usable code, and apparatus for interacting with an abstraction object. An abstraction layer associates a party-focused object, a security-focused object, or both, with an abstraction object. The party-focused or security focused object has one or more properties. The properties are presented in the abstraction object defined by the mapping schema. The abstraction layer converts a set of repository objects to at least one abstraction object.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a timeline of communication in accordance with an illustrative embodiment of the present invention;

DETAILED DESCRIPTION OF THE INVENTION

Figure 1:
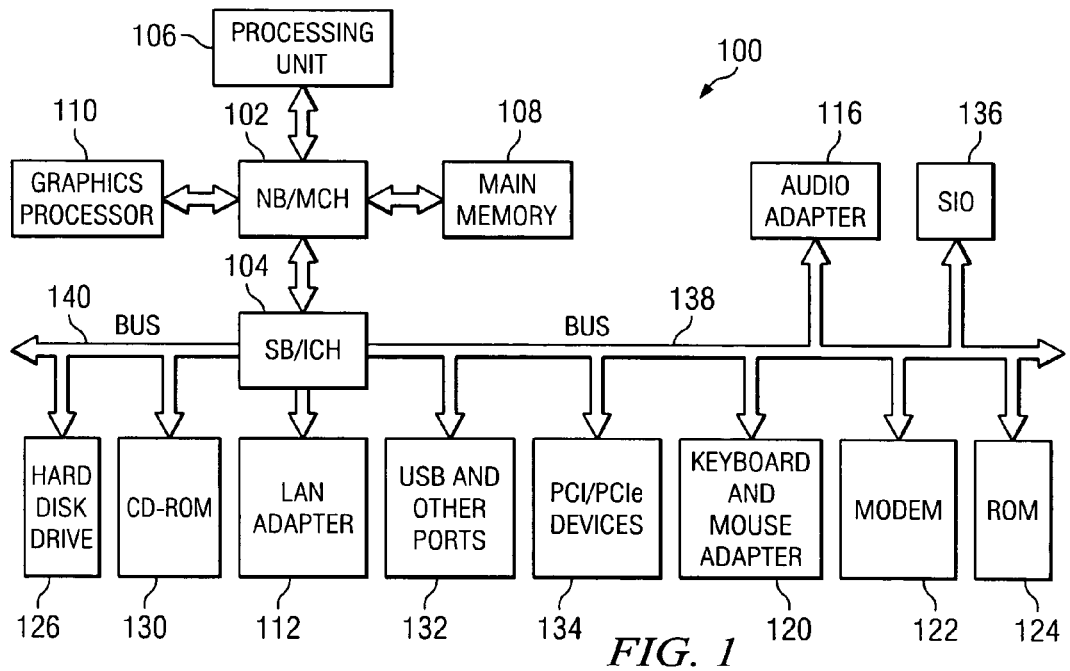
FIG. 1 is a block diagram computer in accordance with an illustrative embodiment of the present invention.

With reference now to the figures and in particular with reference to FIG. 1, FIG. 1 is a block diagram computer in accordance with an illustrative embodiment of the present invention. In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 connect to north bridge and memory controller hub 102. Graphics processor 110 may connect to north bridge and memory controller hub 102 through an accelerated graphics port (AGP), for example.

In the depicted example, local area network (LAN) adapter 112, audio adapter 116, keyboard and mouse adapter 120, modem 122, read only memory (ROM) 124, universal serial bus (USB) ports and other communications ports 132, and PCI/PCIe devices 134 connect to south bridge and I/O controller hub 104 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 104 through bus 140. Hard disk drive 126 and CD-ROM drive 130 may use, for example, an integrated drive electronics (IDE) or serial advanced technology attachment (SATA) interface. Super I/O (SIO) device 136 may be connected to south bridge and I/O controller hub 104.

Figure 2:
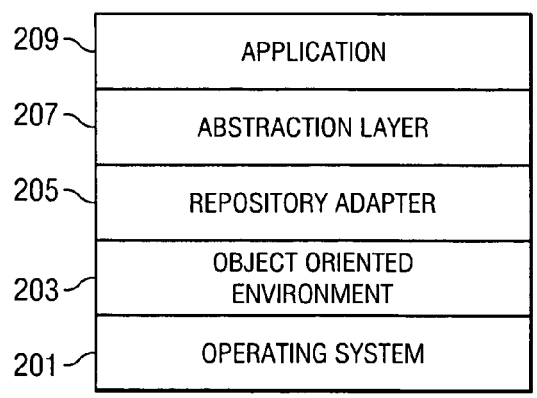
FIG. 2 is a diagram of the software components that may be used in accordance with an illustrative embodiment of the present invention.

FIG. 2 shows a diagram of the software components that operate within an illustrative embodiment of the present invention. An operating system 201 runs on processing unit 106 and coordinates and controls various components within data processing system 100 in FIG. 1. The operating system may be a commercially available operating system, such as Advanced Interactive executive (AIX®), which is available from and is a registered trademark of International Business Machines Corporation. Object oriented environment 203 may be a Java™ virtual machine that presents operating system functionality with richer object controls to higher layers. Java is a trademark of Sun Microsystems, Inc.

Object oriented environment 203 provides a Java™ runtime environment with the ability to execute a Java™ application or applet, which is a program, servlet, or software component written in the Java™ programming language. Repository adapter 205 is a software component that provides functionality to an abstraction layer 207 and optionally, an application 209. Repository adapter 205 and abstraction layer 207 are software components that organize data and functions into objects. Repository adapter 205 may be hosted on a common computer with abstraction layer 207, or be hosted separately, wherein functions are provided from one to another via a network. Likewise, the same computer that hosts abstraction layer 207 may host application 209, or alternatively, a second computer may host application 209.

Thus, embodiments of the present invention may permit a set of one or more applications to select from one or more repositories in a set of repositories. Consequently, an application may be updated to work with both security-focused objects and party-focused objects, available via a single model. This feature may permit an application to be more suited to integrate with a collection of applications of a larger enterprise. Nevertheless, not all instances in a repository may be accessible via the abstraction layer. For example, an object representing a printer in lightweight directory access protocol is not accessible via the abstraction layer or its model. The exclusion of printer access is because a printer is not an object that is commonly associated with security-focused or party-focused models.

Figure 3:
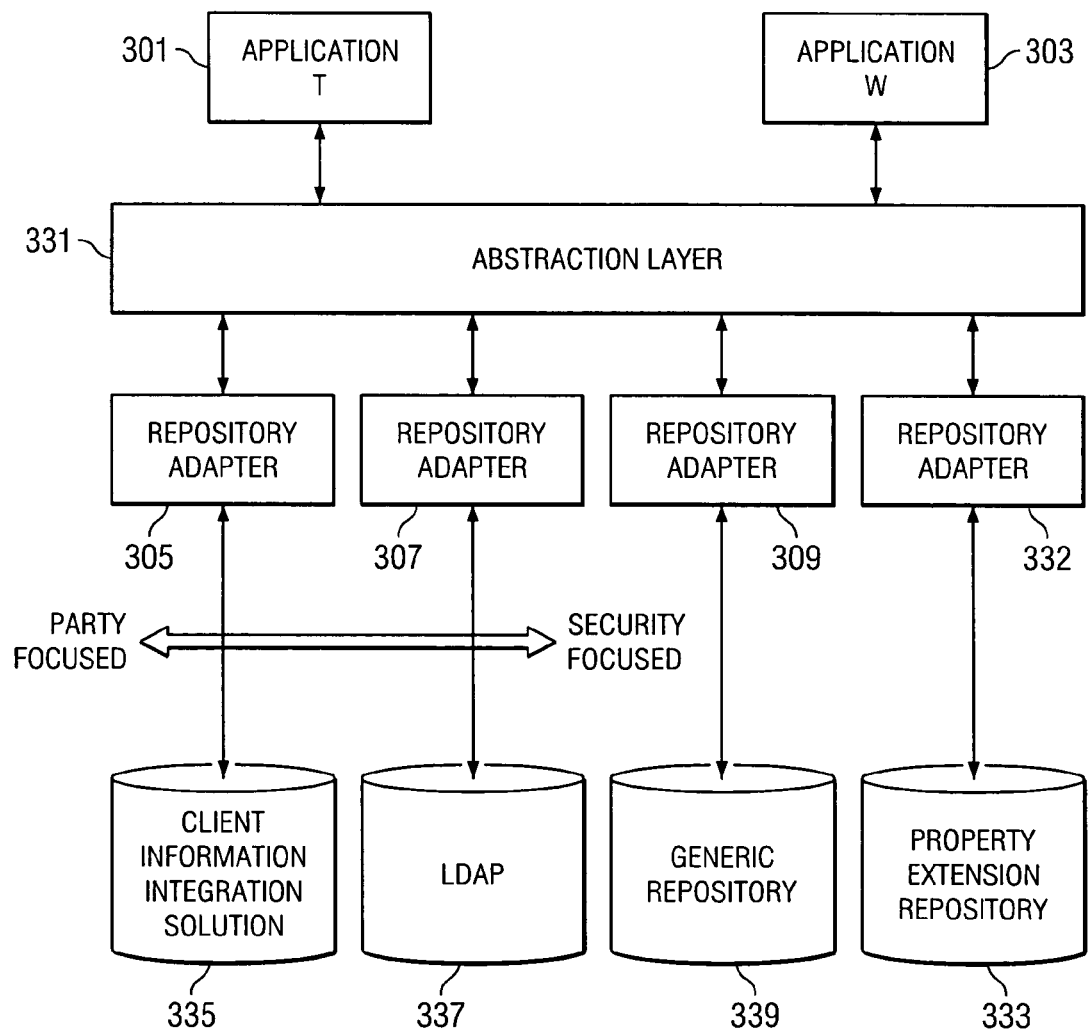
FIG. 3 is a diagram of additional components that may interoperate in accordance with an illustrative embodiment of the present invention.

FIG. 3 is a diagram of additional components that may interoperate in accordance with an illustrative embodiment of the present invention. FIG. 3 shows a mechanism to permit a security-focused application, Application T 301, to interact with more than just a Lightweight Directory Access Protocol (LDAP) repository 337. Security-focused application T 301 may be, for example, from International Business Machines' Tivoli™. An application is a software component that may respond directly to user entries and commands at a high level, and delegates data intensive operations to other software components.

Without implementing an embodiment of the invention, application W 303 may have relied on Client Information Integration Solution repository 335 as a sole source for party-focused data. Party-focused repositories provide modeling for properties that define the role of an entity. A party-focused repository is a repository that has a partyrole object such that the object represents a relationship between one role player and another role player. Furthermore, party-focused repositories permit a role to be a persona, wherein an application may operate on people and organization entities based on the roles people and organizations play relative to each other. Application W 303 may be, for example, a party-focused application such as International Business Machines Websphere® Customer Center, a registered trademark of International Business Machines Corporation.

An application operates, for example, on data processing system 100 of FIG. 1. A repository is where data is stored and maintained, for example, an array of hard drives coupled to one or more processors. The repository usually has a software front end to mediate accesses and perform housekeeping functions. A repository can be a place where multiple databases or files are located for distribution over a network, or a repository can be a location that is directly accessible to the user without having to travel across a network. Thus, a repository may be a Lightweight directory access protocol server, a database, or even another application. A security-based repository is a repository that stores and provides access to objects that assign values to the properties named "userpassword" and a unique identifier for each object of the repository, for example, as defined in the Request For Comments (RFC) 2256 of the Internet Engineering Task Force, and hereby incorporated by reference. A security-focused object is an object that includes at least one of the properties concerning security, for example, the properties or attributes defined in RFC 2798 and related Requests For Comments of the IETF and related organizations, which is hereby incorporated by reference.

An example of a repository is a party-focused repository offered by International Business Machines Corporation. In this example, this type of repository is Client Information Integration Solution repository 335. Client Information Integration Solution repository 335 responds to requests, such as, for example, create, read, update, delete, and search records or objects held therein. Because Client Information Integration Solution repository 335 is party-focused, Client Information Integration Solution repository 335 contains objects that relate entities to each other. The organization is an object of the mapping schema discussed below. "Organization" represents an organization such as a company or an enterprise, subsidiary, or an organizational unit such as a division, location, or department. The organization object may be used to present properties of both security-focused objects and party-focused objects.

An abstraction object is an object that includes one or more values copied from a source object. The source object is either a party-focused object or a security-focused object. The abstraction object may add at least one additional value that is from a repository object that is not a source object. The kinds of properties an abstraction object may have are defined by the mapping schema. The mapping schema shows how an object may include the properties of a parent object from which the object inherits one or more properties. "Orgcontainer" is an abstraction object that has properties that may have their origin in party-focused objects or security-focused objects. Lightweight directory access protocol uses the specific class of "organization", which is nearly semantically the same as the abstraction object "orgcontainer". A repository object is an object that is defined in an existing repository and may be a source object. In other words, the repository object is an object that is defined within the context of the repository.

A repository object is an object that is defined in an existing repository and may be either a party-focused object or a security-focused object.

A party-focused object is an object that includes at least one of the properties concerning parties, for example, the properties or attributes defined in "Party Management Facility Specification, Version 1.0" Copyright February 2001, which is hereby incorporated by reference. For example, party-focused repositories use a party-focused object of 'organization'. This is semantically the same as the abstraction object, 'orgcontainer'.

Another example of a repository is Lightweight Directory Access Protocol (LDAP) repository 337. Lightweight Directory Access Protocol (LDAP) repository 337 responds to repository requests, such as, for example, create, read, update, delete, and search. Such repository requests are for the purposes of an application obtaining records or objects held therein. Because Lightweight Directory Access Protocol (LDAP) repository 337 is security-focused, Lightweight Directory Access Protocol (LDAP) repository 337 contains inetorgperson objects. Inetorgperson objects are described in Request For Comments (RFC) 2798 of the Internet Engineering Task Force, and hereby incorporated by reference. Properties of an inetorgperson include, mail address and given name, among others. A drawback of the lightweight directory access protocol and other security-focused repositories are that such repositories lack the distinction between inetorgpersons that are established for programs that run automatically, and inetorgpersons that are established for actual people. An inetorgperson object is ambiguous as to whether the object is a person, an account, or a user. The models described in the illustrative embodiments of the present invention differentiate between an account that is used for logging in having person properties from simply a person. In addition, illustrative embodiments of the present invention differentiate between an account to be used by a person from an account to be used by an application Application T 301 may be security-focused. Developers may later enhance application T 301 functionality to handle a limited number of party functions. For example, in a situation where a company hires an employee, application T 301 may issue a series of requests for a repository action. A repository action is an action of a repository that includes creating, reading, updating, deleting, and searching data in the repository. The action may include, for example, creating various accounts and roles. Lightweight Directory Access Protocol (LDAP) repository 337 handles requests concerning accounts. Client Information Integration Solution repository 335 handles requests concerning roles of parties and entities. Application T 301 transmits a request for a repository action. Abstraction layer 331 receives the request for a repository action.

An object is a data structure that is comprised of one or more properties. A property is readable data that is writable by any program or method of an object to which the property belongs. The property may be conditionally readable and writable, depending upon whether there is contention for the property or upon limitations placed on a user or program. A property may be a name, such as "uid". The name may be assigned one or more values. Thus, an object may be a inetorgperson. Inetorgperson may comprise property "uid" assigned the value "janette". In the RFC 2798-defined inetorgperson, the "uid", or unique identifier, is defined as a name that distinguishes a person from any other person in the context or namespace that the inetorgperson is located. Therefore, in our example, the object is an inetorgperson that sets the "uid" to be "janette", the unique identifier for a person or program named "janette".

In these illustrative examples, the request for a repository action includes a property name and a property value, e.g. "read uid=janette". The request for a repository action may include, for example, an action selected from: create, read, update, delete, and search. The application that sends a particular request for a repository action is the application source with respect to the request and any follow-up response. Thus, a source is the application from which abstraction layer 331 receives a request for a repository action.

Abstraction layer 331 mediates requests for repository action by selecting an appropriate repository to receive a repository request, and by forwarding the request to a repository adapter that corresponds to the selected repository. For example, FIG. 3 has three repositories that comprise a set of repositories: Client Information Integration Solution repository 335; Lightweight Directory Access Protocol (LDAP) repository 337; and generic repository 339. Each repository has a corresponding repository adapter, repository adapter 305, repository adapter 307, and repository adapter 309, respectively. Because each repository is from different manufacturers, and may have peculiar forms for handling a given request, the repository adapter converts a general form request into a form specific to the particular repository to which the adapter attaches.

TABLE 1

| request index | action | Object | identifier/type | repository |
| --- | --- | --- | --- | --- |
| 1 | create | Person | PersonE1 | CIIS |
| 2 | create | PartyRole | Employee | CIIS |
| 3 | create | PartyRole | Agent | CIIS |
| 4 | create | PartyRole | Customer | CIIS |
| 5 | create | PersonAccount | Employee partyrole | LDAP |
| 6 | create | PersonAccount | Customer partyrole | LDAP |

Table 1 shows six requests for repository action that application T 301 may make. A human operator may interpret, collectively, that the six requests are for a request to add an employee. The human operator may not be aware of the abstraction layer generating multiple requests for repository action because of his single entered request. The create repository requests may not include a unique identifier in a request for repository action, since no data record may exist at the time of the request. Nevertheless, a repository may create a unique identifier as a key to the data record created. Such a key may be returned to abstraction layer 331. The unique identifier is a unique key, among the set of repositories, to identify the record among the repositories. Thus, the unique identifier may be useful to query records later.

FIG. 3 has one or more property-extension repositories, represented by property-extension repository 333. A property-extension repository is a supplemental repository that stores information concerning how an object of a first repository is related to an object of a second repository. In addition, a property-extension repository may store data that is relevant to objects stored in existing repositories. Such data may be considered supplemental to the existing repositories particularly under circumstances wherein applications do not have write permission to the existing repositories, but rather must store changes to the property-extension repository. Property-extension repository 333 may use repository adapter 332 to adapt responses from property-extension repository 333 to a format acceptable to abstraction layer 331.

The examples in FIG. 3 are not meant to limit how the different processes and components for aspects of the present invention can be implemented. FIG. 3 shows three repositories for purposes of illustrating one embodiment of the present invention. Of course, other numbers and types of repositories may be used depending upon the particular implementation.

Figure 4:
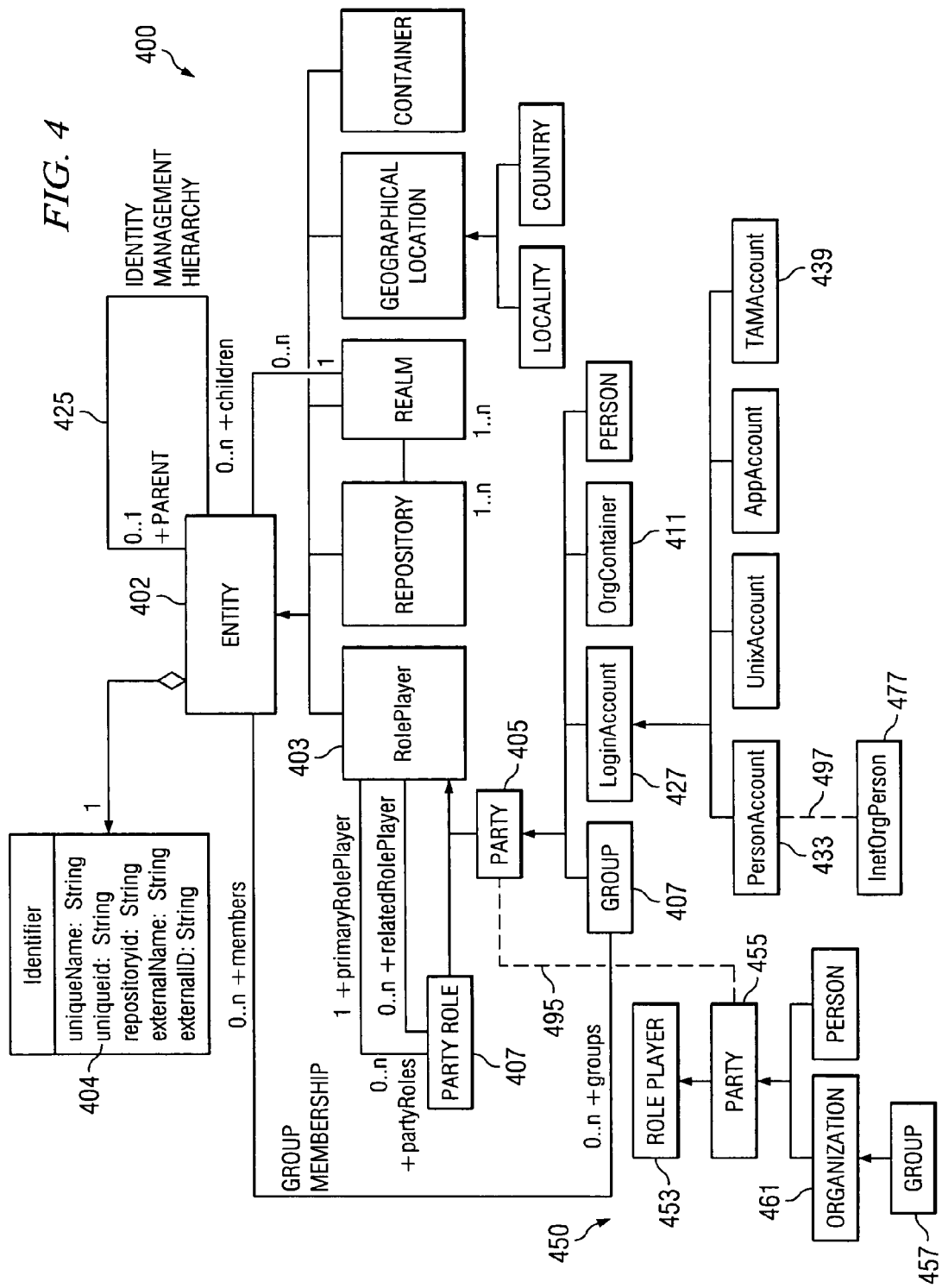
FIG. 4 is a unified modeling language representation of a schema in accordance with an illustrative embodiment of the present invention.

FIG. 4 is a unified modeling language representation of a schema in accordance with an illustrative embodiment of the present invention. FIG. 4 shows parent classes above the classes that are children to the class. An object instantiated according to a class inherits the properties of the parent class. The schema is a mapping schema or model wherein the abstraction layer matches an abstraction object to a repository object of an existing repository. For example, an existing repository may be Lightweight Directory Access Protocol (LDAP) repository 337 of FIG. 3.

A criterion is a linkage of repository information with the repository. The repository information may be a property. The repository information may be a portion of an identifier, for example, the most significant parts of "uid=dkm, ou=Tivoli, ou=SWG, o=IBM" may be used, that is, "ou=Tivoli, ou=SWG, o=IBM". Requests to access the repository that include the repository information may match the criterion, causing the abstraction layer to select the repository. The criterion may be stored as a table that includes an identifier of a generic property, for example, a property name, as well as a locator for the repository, such as, for example, a uniform resource locator. An information technology specialist may establish the table for use by the abstraction layer when first integrating the existing repositories to one or more applications. For example, in a configuration having three repositories, that is, two LDAP repositories, "LDAP1" and "LDAP2", with a general-purpose repository, "database1", a table such as table 3 would match incoming requests to a specific selected repository. For example, any request that has ou=AIM, ou=SWG and o=ibm is routed to LDAP2. Integration comprises storing in a table accessible to the abstraction layer wherein at least one criterion for selecting a repository is established.

TABLE 2

| | Access information requested | Repository to access |
|---|---|---|
| 1 | ou = tivoli, ou = SWG, o = ibm | LDAP1 |
| 2 | ou = AIM, ou = SWG, o = ibm | LDAP2 |
| 3 | ou = Lotus, ou = SWG, o = ibm | database 1 |

Still referring to FIG. 4, two models of existing repositories are illustrated. First is party-focused repository model 450. Second is security-focused repository model, for example, comprised of inetorgperson 477 objects. Each model establishes definitions and relationships between objects instantiated from classes of the model. Mapping schema 400 provides a more universal and varied set of abstraction objects with respect to properties that pertain to security and parties. A mapping schema is a model that includes many security based properties and party based properties of existing models, though not organized such that all properties exist in the same objects as the existing repositories. Thus, the mapping schema establishes definitions of properties of at least two existing models, and describes relationships between properties and objects of each of the separate existing models. The generic classes may be stored within a class structure that is hierarchical and inclusive in nature. Thus, abstraction layer 331 of FIG. 3 may present an abstraction object to a requesting application that completes details or properties otherwise unavailable had only a single repository been accessible. For example, entity 402 and roleplayer 403 are each generic classes wherein roleplayer 403 instantiates objects that roleplayer 403 inherits from entity 402. Entity self-referential relationship 425 shows that an entity object may be associated with yet another entity object. Each entity object is assigned at least one unique identifier, "uniqueID" 404.

Multiple levels of inheritance are possible within mapping schema 400. For example, an entity 402 may relate to additional entities, for example, roleplayer 403 inherits properties of entity 402, and party 405 inherits properties of roleplayer 403. Mapping schema 400 includes at least one abstraction object that is nearly semantically the same as an existing repository object. For example, the abstraction object party 405 is consistent with repository object party 455 of, for example, Client Information Integration Solution repository 335 of FIG. 3. A repository object includes a property of an existing repository.

An administrator may add an abstraction layer to a repository operated according to the party-focused repository model 450. The administrator maps or commands the abstraction layer to map the set of repository objects of repository model 450 to mapping schema 400. A repository object is an object in an existing repository, for example, organization 461. Mapping comprises storing to a data structure the correspondence of an abstraction object to both the repository object and the existing repository that handles requests concerning that object. FIG. 4, for the sake of simplicity, shows the party mapping 495 as a dashed line linking repository object party 455 with abstraction object party 405. In this case, repository object party 455 and abstraction object party 405 have the same properties. Additional objects may also be mapped to an abstraction object, but the dashed lines are omitted here for the sake of clarity in the figure. Roleplayer 453 maps to roleplayer 403. Organization 461 maps to orgcontainer 411. The repository object organization 461 has a single property of "name" which is assigned the organization name applicable to the instance. However, the abstraction object orgcontainer 411 has two properties: "name" which is assigned the organization name, and "type" which is assigned the hierarchical designator for the organization, for example, department, division, and the like. Group 457 maps to group 407.

On the security-focused side, the abstraction object, personaccount 433, is consistent with the repository object, inetorgperson 477, of, for example, Lightweight Directory Access Protocol (LDAP) repository 337 of FIG. 3. Thus, an abstraction layer creates an association 497 between the abstraction object, personaccount 433, with the repository object, inetorgperson 477. Loginaccount 427 is extended by further objects that include properties that enable additional shades of distinction between login instances of a loginaccount. For example, if the abstraction layer is hosted on a computer running a Unix operating system, the abstraction object Unixaccount 435 may be mapped to an account on the Unix operating system. Thus, a valid mapping would be to map repository object, inetorgperson 477, to abstraction object, personaccount 433. In the event that an additional lightweight directory access protocol repository were interconnected to an abstraction layer, for example, a Tivoli Access Manager (TAM) TAMAccount, further properties or details relevant in the Tivoli Access Manager context would be stored in TAMAccount object 439. Nevertheless, if there is only a lightweight directory access protocol repository connected, the remaining objects of the abstraction object, loginaccount 427, would be not be needed and would therefore be removed from the mapping schema. It is appreciated that for a repository, such as Lightweight Directory Access Protocol (LDAP) repository 337 of FIG. 3, fewer or greater numbers of objects may be mapped to abstraction objects of mapping schema 400.

When a request for a repository action is received, the abstraction layer selects from among repositories by looking up each object name in the request. The abstraction layer makes a repository request to the first repository for those objects that match with a first repository. The abstraction layer makes a repository request to the second repository for those objects that match with a second repository.

FIG. 5 is a timeline of communication in accordance with an illustrative embodiment of the present invention. The communication may correspond to the operation of application 301 of FIG. 3 requesting a repository action from a repository. For example, application 510 sends a message 501 or forms an interprocess communication that includes "read uid=dkm", essentially requesting that abstraction layer 520 provide all details concerning user identifier "dkm" which may be a name for "David Kuehr-Mclaren". Abstraction layer 520 consults mapping information in table 2 or a mapping schema, for example, mapping schema 400 of FIG. 4, or a property-extension repository to determine what repositories should be queried. For example, the property-extension repository may indicate that two repositories should be queried, a lightweight directory access protocol repository and a Client Information Integration Solution (CIIS) repository.

Abstraction layer 520 makes a repository request, for example, "read uid=dkm, ou=Tivoli, ou=swg, o=ibm" 551. A repository adapter receives the repository request. The repository adapter may be, for example, LDAP repository adapter 540, that sends adapted repository request 553. LDAP repository adapter 540 adapts the repository request to a form acceptable to LDAP repository 560. LDAP repository adapter 540 transmits the repository request 553 to LDAP repository 560. LDAP repository 560 performs the request and looks up an object. LDAP repository 560 transmits the object as a repository response 555. Repository response 555 may include a personaccount object having a property of "uid=dkm". The object may be, for example, a Java™ object serialized in an extensible markup language document. Java is a trademark of Sun Microsystems Inc. LDAP repository adapter 540 receives the repository response. LDAP repository adapter 540 may then convert the repository response.

LDAP repository adapter 540 transmits the repository response 557 to abstraction layer 520. Because property-extension repository also indicated that a client information integration solution repository should be queried, abstraction layer 520 transmits a request for a repository action 561 to client information integration solution repository adapter 530. Client information integration solution repository adapter 530 then converts, as needed, to a format acceptable to client information integration solution repository 550. Client information integration solution repository adapter 530 transmits repository request 565 to client information integration solution repository 550. Client information integration solution repository 550 looks up an object, for example, party object 567 that meets the conditions set in the repository request. Client information integration solution repository 550 then transmits party object 567 to client information integration solution repository adapter 530. Client information integration solution repository adapter 530 then converts the party object, as needed, and transmits the converted party object 569 to abstraction layer 520. Abstraction layer 520 collects party object 569 then transmits party object 571 to application 510. Abstraction layer 520 also transmits a loginaccount object, such as loginaccount object 559, to application 510. Although FIG. 5 depicts an asynchronous return of objects to application 510, it is appreciated that roleplayer object and loginaccount object may also be incorporated into a single message sent to application 510 from abstraction layer 520. In addition, the property values of the two objects may also be incorporated into a single object within the single message.

Figure 6A:
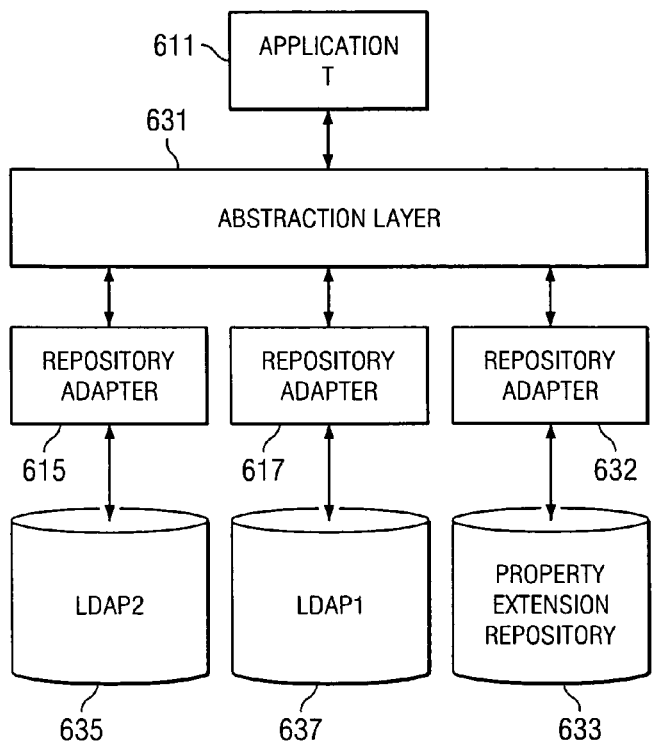
FIG. 6A is a diagram of components that may interoperate in accordance with an illustrative embodiment of the present invention.

FIG. 6A is a diagram of components that may interoperate in accordance with an illustrative embodiment of the present invention. Application 611 interconnects to abstraction layer 631. Abstraction layer 631 connects to existing repositories through repository adapters 615 and 617, respectively. A first repository, LDAP1 637, connects via repository adapter 617 and a second repository, LDAP2 635, connects via repository adapter 615. Property-extension repository 633 connects to abstraction layer 631 via repository adapter 632.

Figure 6B:
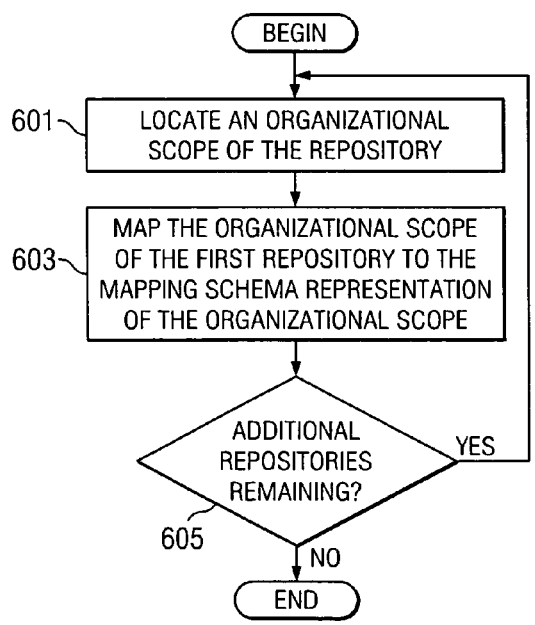
FIG. 6B is a flow diagram of an initial mapping from repositories to the schema in accordance with an illustrative embodiment of the present invention.

FIG. 6B is a flow diagram of an initial integration and mapping from two lightweight directory access protocol repositories to the mapping schema in accordance with an illustrative embodiment of the present invention. An abstraction layer, for example, abstraction layer 631 of FIG. 6A, performs the steps of the flow chart. When an abstraction layer is added to a set of repositories, the objects of each repository are mapped to the objects of the mapping schema. Initially, abstraction layer 631 locates an organizational scope of a repository (step 601). In the example of FIG. 6A, LDAP1 637 has the organizational scope of organization=ibm, organizational unit=SWG, and organizational unit=Tivoli. Abstraction layer 631 maps the organizational scope of the repository to the mapping schema representation of the organizational scope (step 603). For example, abstraction layer 631 may store such a mapping in the manner shown in the first line of Table 3. It is appreciated that the repository adapters may perform many other forms of conversion aside from organizational scope, and that organizational scope is merely an example.

TABLE 3

| mapping index | Application side | Repository side |
|---|---|---|
| 1 | ou = tivoli, ou = SWG, o = ibm | ou = tivoli, ou = swg, dc = ibm, dc = com |
| 2 | ou = AIM, ou = SWG, o = ibm | ou = AIM, ou = SWG, dc = ibm, dc = com |

Abstraction layer 631 determines if additional repositories remain (step 605). Providing additional repositories remain, for example, LDAP2 635 of FIG. 6A, abstraction layer 631 locates the organizational scope of that repository at step 601. Abstraction layer 631 may store such a mapping in the manner shown in the second line of Table 3. Table 3 may be stored for later look-up in property-extension repository 633 of FIG. 6A. If no additional repositories remain, the process terminates thereafter.

Figure 7:
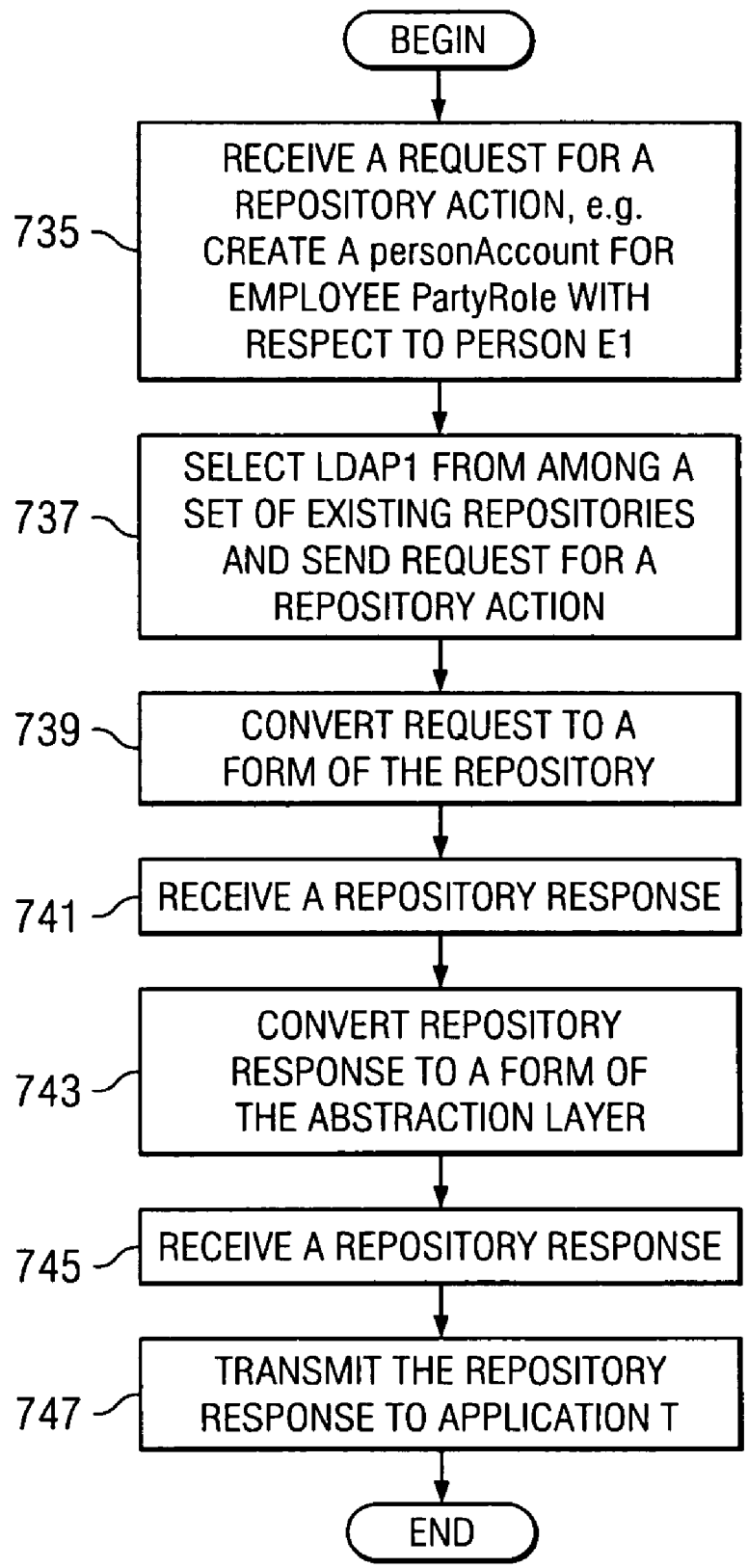
FIG. 7 is a flow diagram of operation with repository requests in accordance with an illustrative embodiment of the present invention.

FIG. 7 is a flow diagram of operation with repository requests in accordance with an illustrative embodiment of the present invention. An abstraction layer, for example, abstraction layer 520 of FIG. 5, performs the steps of the flow chart. The abstraction layer receives a request for a repository action, for example, to create a personaccount for an employee partyrole with respect to person, "PersonE1" (step 735). A Partyrole may be partyrole 407 of FIG. 4. The application that sends the request is the source application. A source application is the source that corresponds with the request for repository action. The abstraction layer selects a lightweight directory access protocol repository from among a set of existing repositories and sends the request for a repository action (step 737). The repository adapter converts the request to a form of the lightweight directory access protocol repository (step 739). The form of the lightweight directory access protocol directory is a repository request. The conversion is illustrated in the content of repository request 551 and adapted repository request 553 of FIG. 5, wherein the "ou" or organizational unit properties remain unchanged, while the property of o=ibm is converted to dc=ibm and dc=com. Following conversion or part of conversion includes repository adapter sending an adapted repository request to the repository. The repository transmits a response. The repository adapter receives the repository response (step 741). The repository adapter converts the response to a form of the abstraction layer (step 743). The abstraction layer receives the repository response (step 745). The abstraction layer transmits the repository response to the application T (step 747) with the process terminating thereafter.

Thus, embodiments of the present invention allow a set of applications to select from one or more repositories in a set of repositories. In addition to having access to the data structures for which an application may have been initially designed, an abstraction layer may permit an expanding universe of data properties to be available to the application. Consequently, an application may be updated to work with new but peripheral classes of data to the data for which the application was first designed. In addition, an application becomes better suited to integrate with a collection of applications from a larger enterprise.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of handling data requests to multiple data repositories, the computer-implemented method comprising:

executing instructions from a computer program in a processor, wherein the instructions, when executed, perform the process of:

receiving, at an abstraction layer, a repository request from an application, wherein the abstraction layer interfaces between multiple applications and multiple data repositories;

converting, in the abstraction layer, the repository request into an abstraction object, wherein the abstraction object comprises values from the repository request and values from disparate data repositories, wherein the values from the disparate data repositories describe whether a particular data repository is party-focused or security-focused, wherein a party-focused repository organizes and stores data according to a role of a user within an organization, and wherein a security-focused repository organizes and stores data according to an identity of a particular user of the application;

determining, within the abstraction layer, which of the multiple data repositories is an appropriate data repository, wherein the appropriate data repository uses a type of data organization that is consistent with a data type used by the repository request;

transmitting the abstraction object that represents the repository request from the abstraction layer to a repository adapter for the appropriate data repository, wherein each data repository from the multiple data repositories has a corresponding repository adapter, and wherein each corresponding repository adapter converts the abstraction object into an object that is understood by an associated data repository for handling the repository request;

receiving, at the abstraction layer, a response to the repository request from the appropriate data repository, wherein the response is a repository object that is converted by the repository adapter for the appropriate data repository into a response abstraction object before being received by the abstraction layer;

upgrading the application to handle the response abstraction object; and transmitting the response abstraction object to the application, wherein the application is able to work with both security-focused objects and party-focused objects via a singular abstraction object.

2. The computer-implemented method of claim 1, wherein the repository request is a request to create data in a repository.

3. The computer-implemented method of claim 1, wherein the repository request is a request to read data from a repository.

4. The computer-implemented method of claim 1, wherein a mixed repository comprises a printer and a software resource, wherein an object representing the software resource is accessible via the abstraction layer, and wherein an object representing the printer is not accessible via the abstraction layer.

5. The computer-implemented method of claim 1, wherein a mixed repository comprises non-computing hardware resources and software resources, wherein objects representing the software resources are accessible via the abstraction layer, and wherein objects representing the non-computing hardware resources are not accessible via the abstraction layer.

6. The computer-implemented method of claim 1, further comprising:

shielding the abstraction layer from the user, wherein the user is unaware of the abstraction layer when making the repository request.

7. The computer-implemented method of claim 1, further comprising:

mapping, by the abstraction layer, an organizational scope of each of the multiple data repositories to a mapping schema of an organization, wherein the mapping directs the repository request to the appropriate data repository.

8. A computer readable storage media on which is stored a computer program product, wherein the computer program product, when executed, performs a process for handling data requests to multiple data repositories, the process comprising:

receiving, at an abstraction layer, a repository request from an application, wherein the abstraction layer interfaces between multiple applications and multiple data repositories;

converting, in the abstraction layer, the repository request into an abstraction object, wherein the abstraction object comprises values from the repository request and values from disparate data repositories, wherein the values from the disparate data repositories describe whether a particular data repository is party-focused or security-focused, wherein a party-focused repository organizes and stores data according to a role of a user within an organization, and wherein a security-focused repository organizes and stores data according to an identity of a particular user of the application;

determining, within the abstraction layer, which of the multiple data repositories is an appropriate data repository, wherein the appropriate data repository uses a type of data organization that is consistent with a data type used by the repository request;

transmitting the abstraction object that represents the repository request from the abstraction layer to a repository adapter for the appropriate data repository, wherein the repository adapter converts the abstraction object into an object that is understood by an associated data repository for handling the repository request;

receiving, at the abstraction layer, a response to the repository request from the appropriate data repository, wherein the response is a repository object that is converted by the repository adapter for the appropriate data repository into a response abstraction object before being received by the abstraction layer;

upgrading the application to handle the response abstraction object; and transmitting the response abstraction object to the application, wherein the application is able to work with both security-focused objects and party-focused objects via a singular abstraction object.

9. The computer readable storage media of claim 8, wherein the repository request is a request to create data in a repository.

10. The computer readable storage media of claim 8, wherein the repository request is a request to read data from a repository.

11. The computer readable storage media of claim 8, wherein the repository request is a request to update data in a repository.

12. The computer readable storage media of claim 8, wherein a mixed repository comprises hardware resources and software resources, and wherein the process further comprises:

prohibiting the abstraction layer from accessing the hardware resources in the mixed repository.

13. The computer readable storage media of claim 8, wherein the process further comprises:

shielding the abstraction layer from the user, wherein the user is unaware of the abstraction layer when making the repository request.

14. The computer readable storage media of claim 8, wherein the process further comprises:

mapping, by the abstraction layer, an organizational scope of each of the multiple data repositories to a mapping schema of an organization, wherein the mapping directs the repository request to the appropriate data repository.

15. A computer system comprising:

a central processing unit (CPU), a computer readable memory, and a computer readable storage media;

first program instructions for receiving, at an abstraction layer, a repository request from an application, wherein the abstraction layer interfaces between multiple applications and multiple data repositories;

second program instructions for converting, in the abstraction layer, the repository request into an abstraction object, wherein the abstraction object comprises values from the repository request and values from disparate data repositories, wherein the values from the disparate data repositories describe whether a particular data repository is party-focused or security-focused, wherein a party-focused repository organizes and stores data according to a role of a user within an organization, and wherein a security-focused repository organizes and stores data according to an identity of a particular user of the application;

third program instructions for determining, within the abstraction layer, which of the multiple data repositories is an appropriate data repository, wherein the appropriate data repository uses a type of data organization that is consistent with a data type used by the repository request;

fourth program instructions for transmitting the abstraction object that represents the repository request from the abstraction layer to a repository adapter for the appropriate data repository, wherein each data repository from the multiple data repositories has a corresponding repository adapter, and wherein each corresponding repository adapter converts the abstraction object into an object that is understood by an associated data repository for handling the repository request;

fifth program instructions for receiving, at the abstraction layer, a response to the repository request from the appropriate data repository, wherein the response is a repository object that is converted by the repository adapter for the appropriate data repository into a response abstraction object before being received by the abstraction layer;

sixth program instructions for upgrading the application to handle the response abstraction object; and seventh program instructions for transmitting the response abstraction object to the application, wherein the application is able to work with both security-focused objects and party-focused objects via a singular abstraction object, and wherein the first, second, third, fourth, fifth, sixth, and seventh program instructions are stored on the computer readable storage media for execution by the CPU via the computer readable memory.

16. The computer system of claim 15, wherein the repository request is a request to create data in a repository.

17. The computer system of claim 15, wherein the repository request is a request to read data from a repository.

18. The computer system of claim 15, wherein the repository request is a request to update data in a repository.

19. The computer system of claim 15, wherein a mixed repository comprises hardware resources and software resources, and wherein the computer system further comprises:

eighth program instructions for prohibiting the abstraction layer from accessing the hardware resources in the mixed repository.

20. The computer system of claim 15, further comprising:
eighth program instructions for shielding the abstraction layer from the user, wherein the user is unaware of the abstraction layer when making the repository request.

21. The computer system of claim 15, further comprising:
eighth program instructions for mapping, by the abstraction layer, an organizational scope of each of the multiple data repositories to a mapping schema of an organization, wherein the mapping directs the repository request to the appropriate data repository.

* * * * *